(12) United States Patent
Kurihara et al.

(10) Patent No.: US 6,704,026 B2
(45) Date of Patent: Mar. 9, 2004

(54) GRAPHICS FRAGMENT MERGING FOR IMPROVING PIXEL WRITE BANDWIDTH

(75) Inventors: Steven M. Kurihara, Palo Alto, CA (US); Ewa M. Kubalska, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 280 days.

(21) Appl. No.: 09/861,185

(22) Filed: May 18, 2001

(65) Prior Publication Data

US 2002/0171651 A1 Nov. 21, 2002

(51) Int. Cl.⁷ .................. G09G 11/40; G09G 5/36; G06T 1/60
(52) U.S. Cl. .................. 345/629; 345/614; 345/545
(58) Field of Search .................. 345/540, 545, 345/530, 501, 619, 611, 629, 614

(56) References Cited

U.S. PATENT DOCUMENTS

| | | | |
|---|---|---|---|
| 5,854,631 A | * 12/1998 | Akeley et al. | 345/419 |
| 5,859,651 A | 1/1999 | Potu | |
| 5,990,904 A | 11/1999 | Griffin | |
| 6,188,394 B1 | * 2/2001 | Morein et al. | 345/555 |
| 6,429,876 B1 | * 8/2002 | Morein | 345/611 |

* cited by examiner

Primary Examiner—Kee M. Tung
(74) Attorney, Agent, or Firm—Meyertons Hood Kivlin Kowert & Goetzel, P.C.; Jeffrey C. Hood

(57) ABSTRACT

A merge unit for the merging of tiles or arrays of pixels or samples, and suitable for use in a high performance graphics system is described. The unit may improve the utilization of memory bandwidth by combining non-intersecting tiles of pixels, and hence potentially reducing the number of storage operations to the memory.

29 Claims, 11 Drawing Sheets

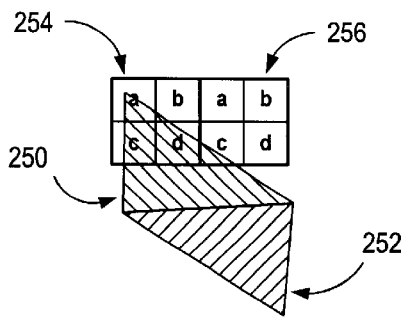
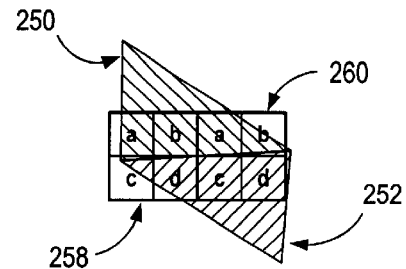
*FIG. 9A*                    *FIG. 9B*
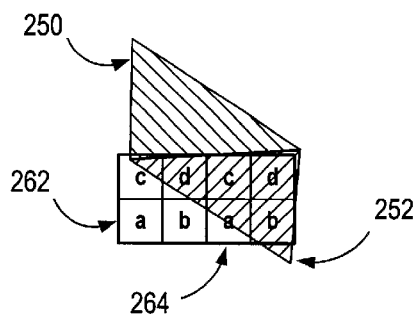
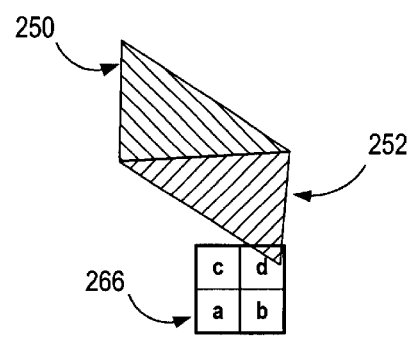
*FIG. 9C*                    *FIG. 9D*
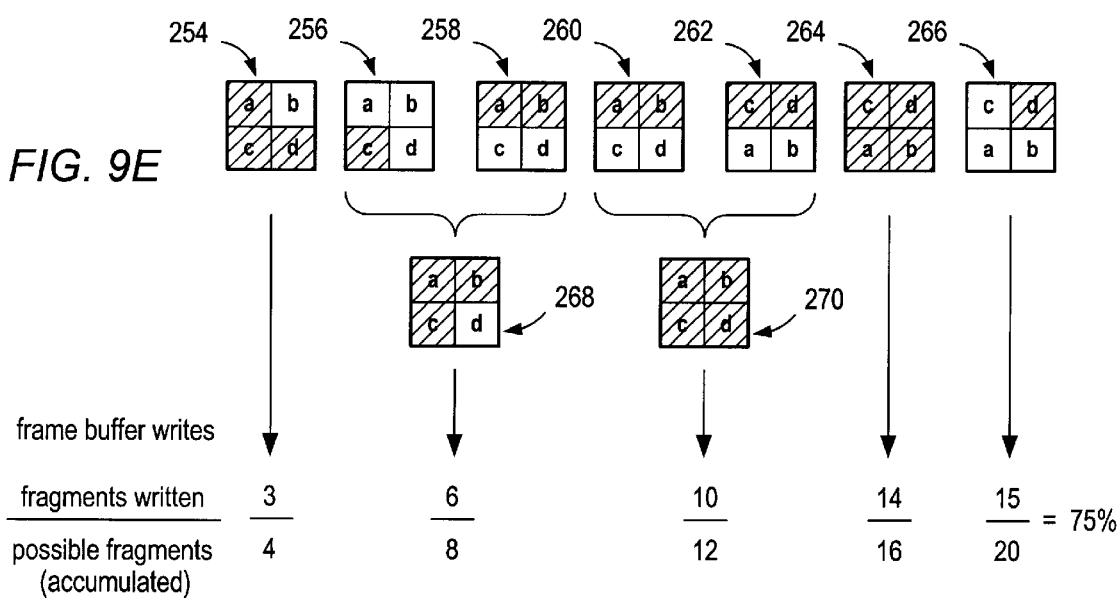

GRAPHICS FRAGMENT MERGING FOR IMPROVING PIXEL WRITE BANDWIDTH

BACKGROUND OF THE INVENTION

1. Field of the Invention

The present invention generally relates to the field of computer graphics systems. More particularly, the present invention relates to rasterization of geometric primitives within computer graphics systems.

2. Description of the Related Art

Successive generations of graphics systems have exhibited increasing performance as a result of ever increasing clock speeds and higher levels of integration. The employment of smaller device geometries and higher clock frequencies have led to significant improvements in the rendering engines of these graphics systems making possible a new host of graphics applications.

However, the continued demand for images of higher quality and faster refresh rates from new applications such as three-dimensional (3D) modeling, virtual reality, and 3D computer games places a steadily increasing burden on graphics systems. Thus designers strive to improve performance throughout the entire graphics system pipeline to try and meet the performance needs of these new applications. Memory systems in general continue to provide design challenges, with the limitations of memory devices defining an upper limit of achievable system performance.

Interleaving is a common design technique employed to overcome the limitations of memory devices. An interleaved memory allows for the storage and retrieval of tiles or arrays of data. The memory is segmented into banks or interleaves, with each bank or interleave receiving a single element of the tile or array. In a high performance graphics system for example, each element may represent a pixel or fragment and a tile may represent a neighborhood of contiguous pixels or fragments. The interleaved system allows for complete tiles to be stored or retrieved in a single memory operation yielding a potential data rate increase of n:1 where n is the number of fragments in a tile.

In order for the graphics system to take advantage of the increased data rate provided by an interleaved memory, the render pipeline should supply a consistent stream of full tiles. Passing partially filled tiles to the memory for storage is likely to degrade the overall system performance. The burden therefore is shifted to the render pipeline to perform pixel-packing functions that may potentially reduce the number of partial tiles sent to the memory while maintaining the spatial interrelationships of the pixel data. For these reasons, a system and method for merging fragments prior to storage is desired.

SUMMARY OF THE INVENTION

The problems set forth above may at least in part be solved in some embodiments by a system or method for combining subsequent tiles of fragments (i.e., pixel data). In one embodiment, the system may include a fragment generator configured to generate tiles of fragments. A merge unit may be connected to the fragment generator and configured to receive the tiles of fragments. The merge unit may be further configured to test subsequent tiles of fragments against a fixed set of rules of combination. The merge unit may be further configured to produce a merged tile of fragments according to the outcome of the test. In some embodiments, some tiles may be deemed ineligible for merging by the merge unit and may receive no processing from the merge unit. A memory may be connected to the merge unit and may be configured to store the merged tiles of fragments. In some embodiments, the memory may be interleaved, and each fragment location in the tiles of fragments may be targeted to a specific interleave.

As noted above, a method for combining subsequent tiles of fragments is also contemplated. In one embodiment, the method may include examining two subsequent tiles of fragments and abandoning the merge operation if the intersection of the two tiles of fragments does not represent an empty set. In some embodiments, the two subsequent tiles of fragments to be merged may be tested against a fixed set of rules of combination. These rules of combination may disqualify certain tiles from the merge process based on the ratio of valid fragments to empty fragments in the tiles. In other embodiments, the rules of combination may further disqualify tiles of fragments from the merge process based on the spatial distribution of valid fragments within the tiles.

In one embodiment, the system for combining subsequent tiles of fragments may be integrated into a graphics system suitable for creating and displaying graphic images. In other embodiments, the system may be part of a separate assembly, communicating with a host graphics system through the use of a data or control bus specific to the host.

BRIEF DESCRIPTION OF THE DRAWINGS

The foregoing, as well as other objects, features, and advantages of this invention may be more completely understood by reference to the following detailed description when read together with the accompanying drawings in which:

FIG. 9 is a diagrammatic illustration of one example of a rendering process which generates subsequent tiles which present a merge opportunity;

Figure 1:
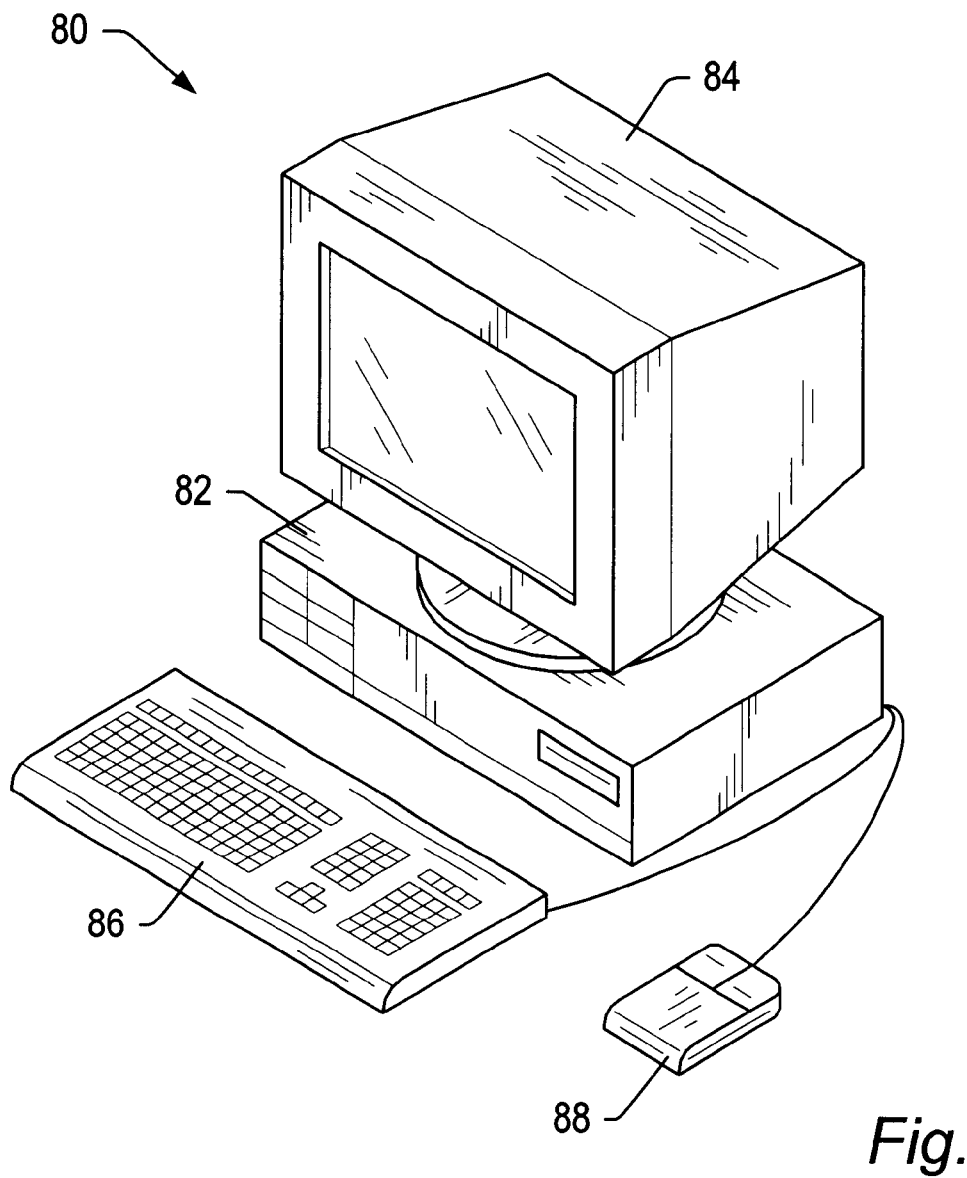
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Please note that the section headings used herein are for organizational purposes only and are not meant to limit the description or claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF THE PREFERRED EMBODIMENTS

Computer System—FIG. 1

Referring now to FIG. 1, one embodiment of a computer system 80 that includes a graphics system that may be used to implement one embodiment of the invention is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
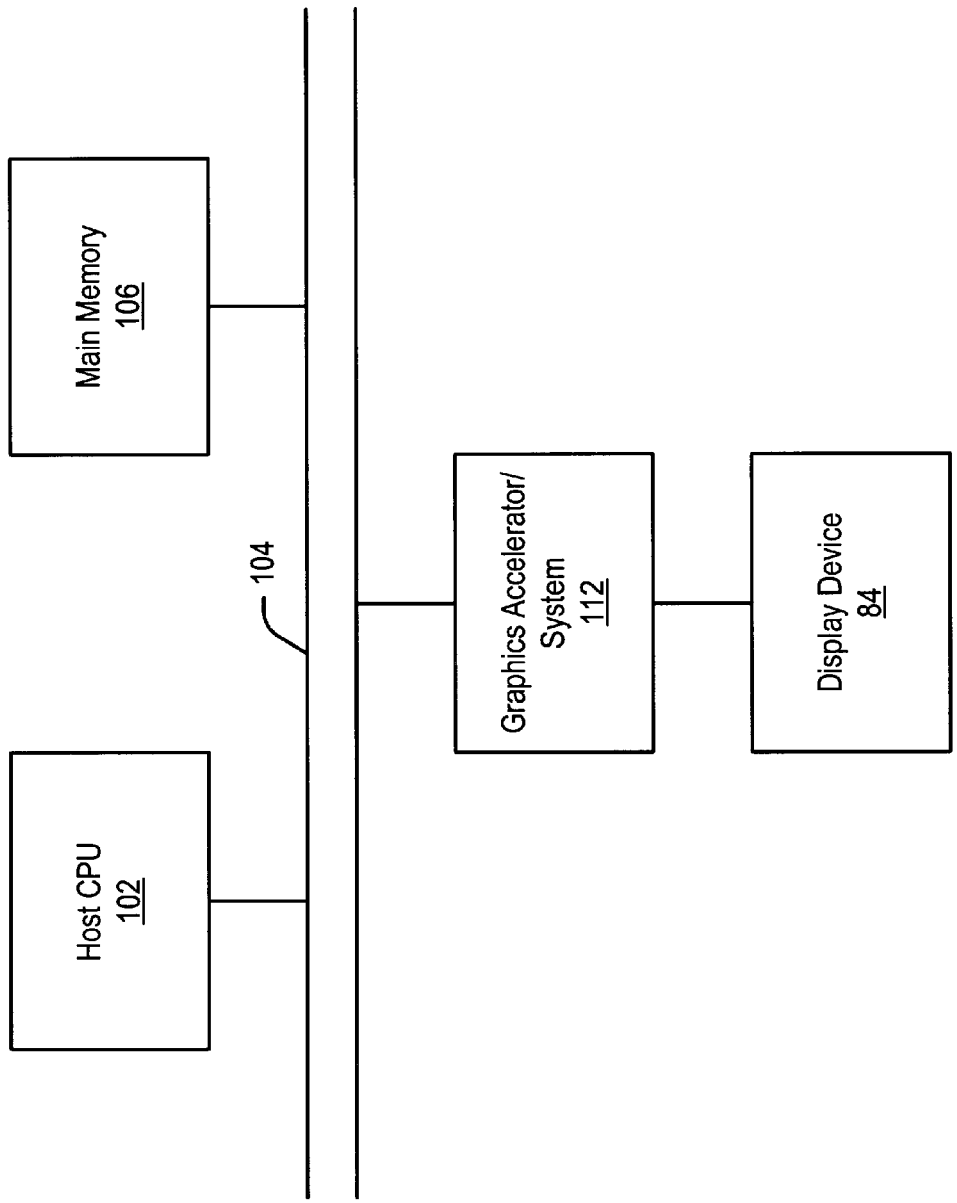
FIG. 2 is a simplified block diagram of one embodiment of a computer system.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
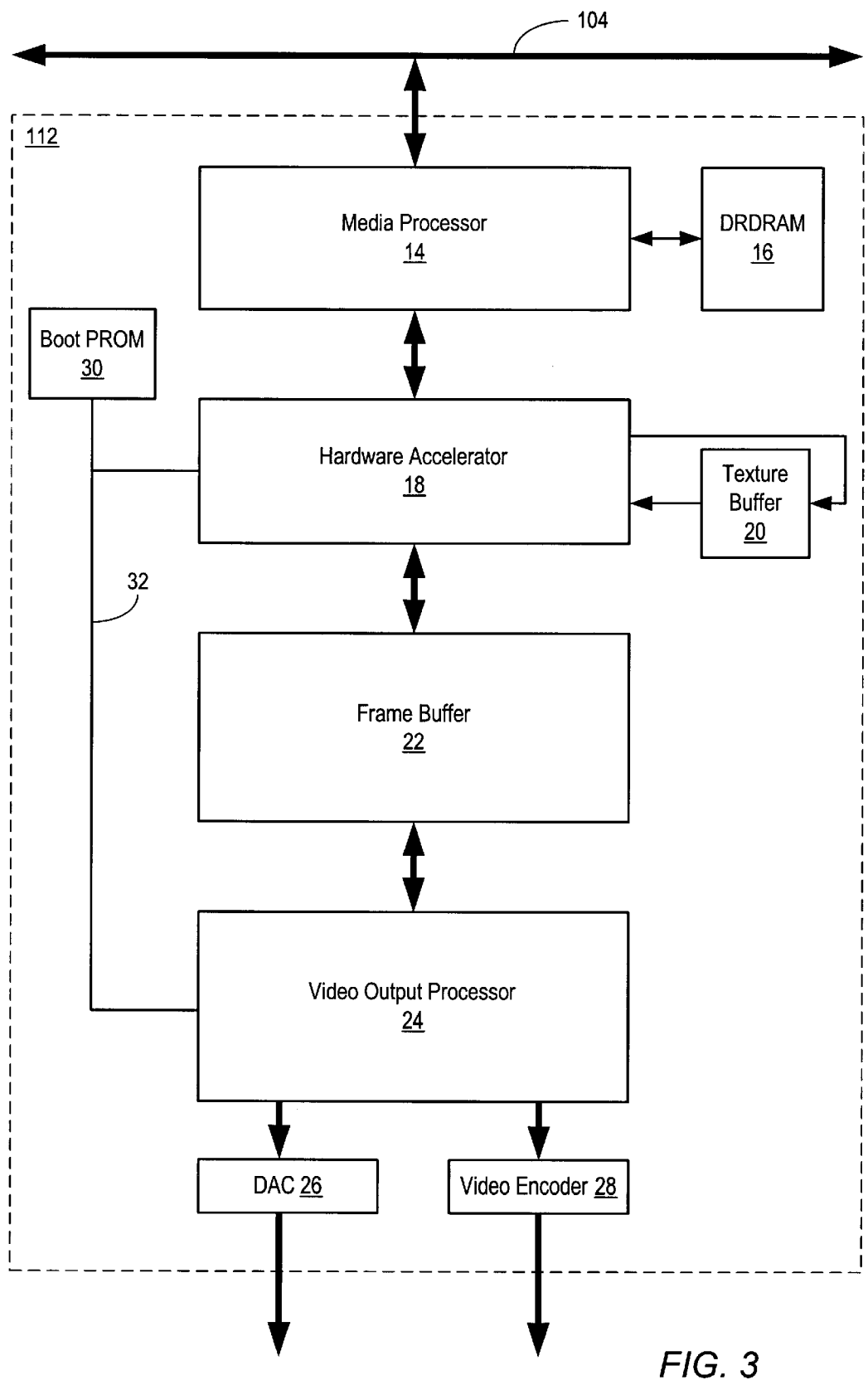
FIG. 3 is a functional block diagram of one embodiment of a graphics system.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Each functional block of graphics system 112 is described in more detail below.

Figure 4:
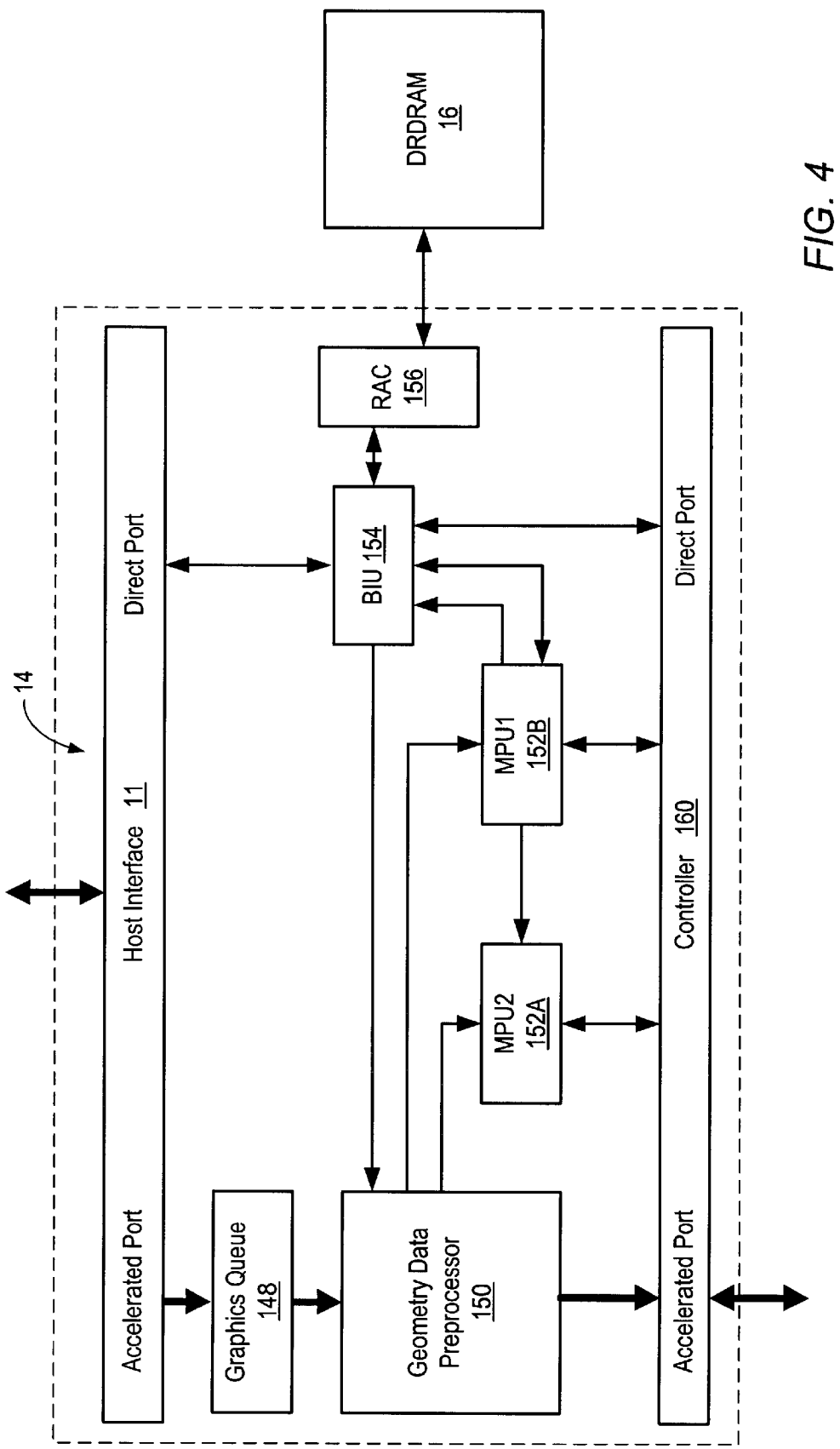
FIG. 4 is a functional block diagram of one embodiment of the media processor of FIG. 3.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
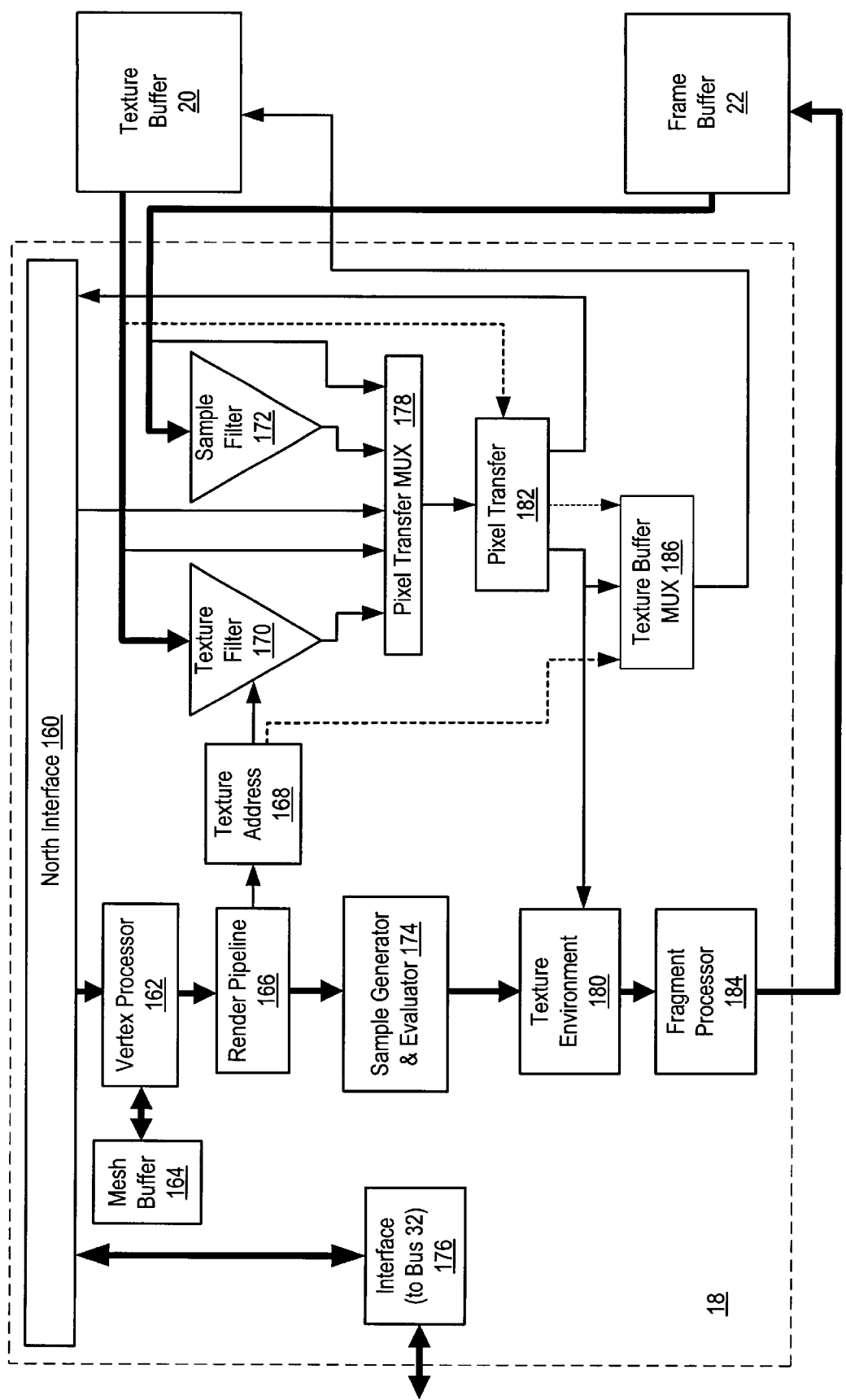
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data. Each of these features is described separately below.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 160 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 160, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture buffer 20 (via the texture buffer MUX 186), the frame buffer 22 (via the texture environment unit 180 and the fragment processor 184), or to the host (via north interface 160). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Texture Buffer—20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple 3DRAM64s. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and supersample buffer.

Video Output Processor

Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency, plane group extraction, gamma correction, pseudocolor or color lookup or bypass, and/or cursor generation. In one embodiment, frame buffer 22 may include multiple 3DRAM64 devices that include the transparency overlay function and all or some of the lookup tables. Video output processor 24 may also be configured to support two video output streams to two displays using the two independent video raster timing generators. For example, one raster (e.g., 196A) may drive a 1280×1024 CRT while the other (e.g., 196B) may drive a NTSC or PAL device with encoded television video.

In one embodiment, the video output processor 24 may directly output digital pixel data in lieu of analog video signals. This may be useful when a display device is based on a digital technology (e.g., an LCD-type display or a digital micro-mirror display).

In one embodiment, video output processor 24 may be configured to output separate red, green, and blue analog signals to a display device such as a cathode ray tube (CRT) monitor. In some embodiments, the video output processor 24 may be configured to provide a high resolution RGB analog video output at dot rates of 240 MHz. In some embodiments, the video output processor 24 may also include an encoder configured to supply an encoded video signal to a display (e.g., encoded NTSC or PAL video).

Fragment Processor—184

Figure 6:
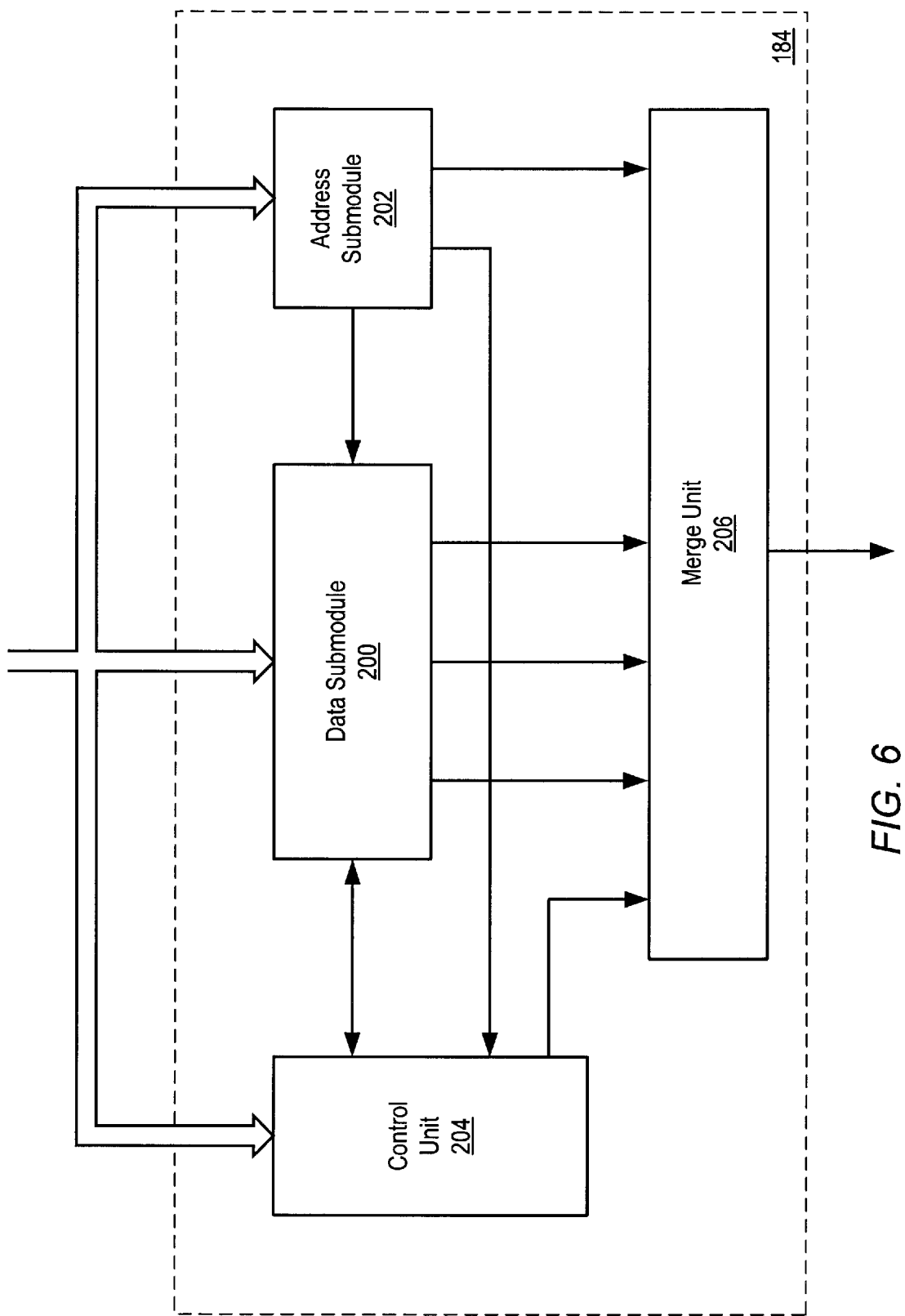
FIG. 6 is a simplified block diagram of one embodiment of the fragment processor of FIG. 5.

Turning now to FIG. 6, one embodiment of the fragment processor 184 is illustrated. The fragment processor 184 may be configured to receive fragment data from the texture environment 180 and perform standard fragment processing operations such as those described by OpenGL. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

The data submodule 200 may be configured to receive a variety of inputs from the texture environment 180, e.g., RGB (color) data, alpha (transparency) data, Z (depth) data. The data submodule 200 may test the inputs from the texture environment 180 and perform various functions in response to signals from the control unit 204. The functions performed in the data submodule may include, for example, Z clipping, depth cueing (fog), area patterning, and thresholding. Whereas some embodiments may implement a subset of this list of functions, other embodiments may incorporate additional functions.

The address submodule 202 may be configured to receive position information related to fragments from the texture environment 180. This position information may include the X and Y coordinates of the fragments within the graphics system display (screen) space, as well as other internal targeting information. In response to this position information, the address submodule 202 may perform tests against current viewport clipping or auxiliary clipping regions and communicate the resulting clip controls to the control unit 204.

The control unit 204 may be configured to generate the control signals which manage the flow of data through the fragment processor 184. In some embodiments, the control unit 204 may encompass registers which control the configuration of the fragment processor, enable functions, describe data types, define area fills, and perform management functions. In some embodiments, the control unit 204 may receive clip controls from the data submodule 200 and the address submodule 202. The clip controls may be combined and communicated to the data submodule 200 where clipped fragments may be culled (i.e., discarded and not sent to the merge unit 206).

In some embodiments, the merge unit 206 may be configured to examine two sequential tiles and determine whether or not the tiles may be merged into one tile before being communicated to the frame buffer 22. For example, in one embodiment, subsequent tiles each having a single fragment, with each fragment being targeted for a different memory interleave, may be combined. In this way, the bandwidth of the frame buffer 22 may be more fully utilized. Some examples are detailed below in order to illustrate how such tiles may be generated and merged. Many other fragment generation schemes are possible and contemplated. These schemes generally combine partially filled tiles. For example, subsequent tiles may be examined to determine which tiles may be successfully combined to produce a single tile.

Turning now to FIG. 7, one example of a fragment generation scenario resulting in subsequent tiles which may be merged is illustrated. In this example, the discussed embodiment employs a tile structure having of two rows of two columns each (i.e., four fragments per tile). Furthermore, the illustrated embodiment of the sample generator 174 has the ability to process more than one geometric primitive simultaneously, with the generation of fragments proceeding in strips which may span more than one primitive.

Figure 7A:
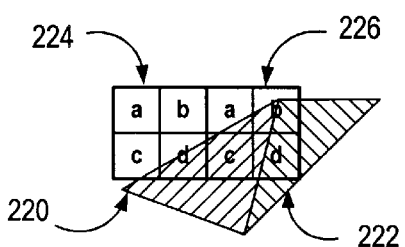
FIG. 7 is a diagrammatic illustration of one example of a rendering process which generates subsequent tiles which present a merge opportunity.

FIG. 7a shows two geometric primitives (in this case triangles) to be rendered (220, 222). As the first render strip is started, two tiles (224, 226) are created for the first triangle 220. The first tile (224) has three empty fragments (a), (b), and (c) whereas (c) may be determined to contain an insignificant portion of the triangle 220 and may be culled. Thus only the (d) interleave of the frame buffer 22 is targeted to receive any data as a result of generating this first tile (224). The second tile (226) may have valid data in each of the fragments targeted for the four memory interleaves. Since the second tile (226) is full there is no opportunity to merge, and consequently both the first tile (224) and the second tile (226) may be conveyed to the frame buffer 22.

Figure 7B:
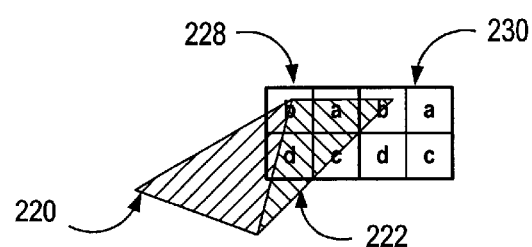

In FIG. 7b, the sample generator 174 has switched to the second triangle 222 and has aligned the generated tiles with the vertices of the second triangle 222. The first strip continues with the generation of a full tile (228) which provides no opportunity to merge and may be conveyed to the frame buffer 22. The strip ends with the generation of a second tile (230) containing only one fragment targeted for the (b) interleave of the frame buffer 22.

Figure 7C:
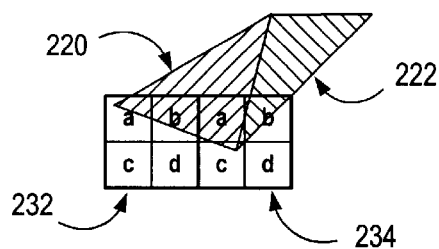

In FIG. 7c, the sample generator 174 has switched back to the first triangle 220 to start the second strip. The first tile generated (232) has valid fragments targeted for the (a) and (b) interleaves. Since the preceding tile (230) had one fragment targeted for the (b) interleave, there is no opportunity to merge and the preceding tile (230) is conveyed to the memory. A second tile (234) is generated for the first triangle 220, and contains only one valid fragment (a). Since the current tile (234) and the preceding tile (232) both have a fragment targeted for the (a) fragment, they may not be merged. Consequently, the preceding tile (232) is conveyed to the frame buffer 22.

Figure 7D:
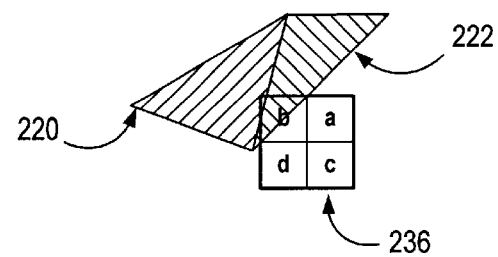

In FIG. 7d, the sample generator 174 has switched to the second triangle 222 and finishes the strip by generating one tile (236). This last tile has a single valid fragment targeted for the (b) interleave. Since the preceding tile had a single fragment targeted for the (a) interleave, the two tiles may be merged to form a single tile (238) with two fragments, one targeted for the (a) interleave, and the other targeted for the (b) interleave. Once the two tiles (234, 236) are merged, the resulting tile (238) may be conveyed to the frame buffer 22.

Figure 8A:
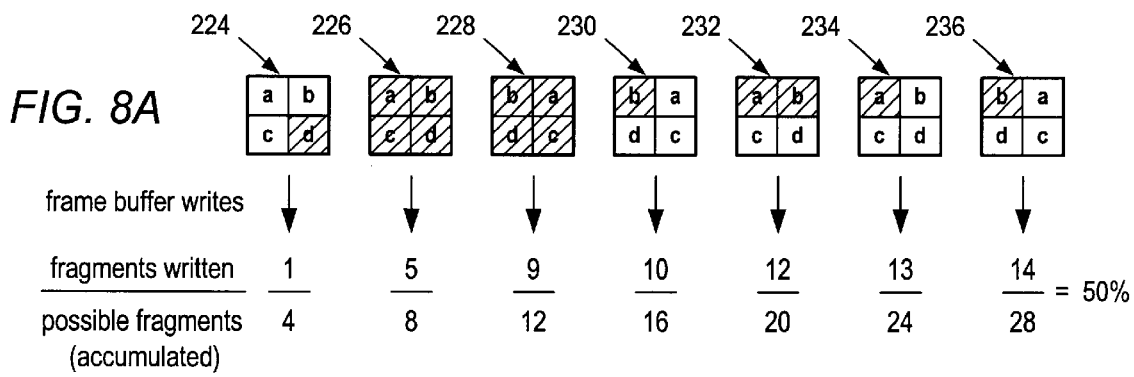
FIG. 8 is a diagrammatic illustration of two embodiments of a method for merging the merge candidate tiles produced by the example of FIG. 7.

Turning now to FIG. 8, a summary of the tile generation process for the previous example of two triangles (220, 222) is shown. In FIG. 8a, the tiles generated are shown with no merging enabled. In this particular example, 7 writes to the frame buffer 22 are required to store the generated tiles potentially storing a total of 28 fragments. However, in this example only 14 valid fragments are generated. This yields a 50% usage of the potential frame buffer 22 bandwidth.

Figure 8B:
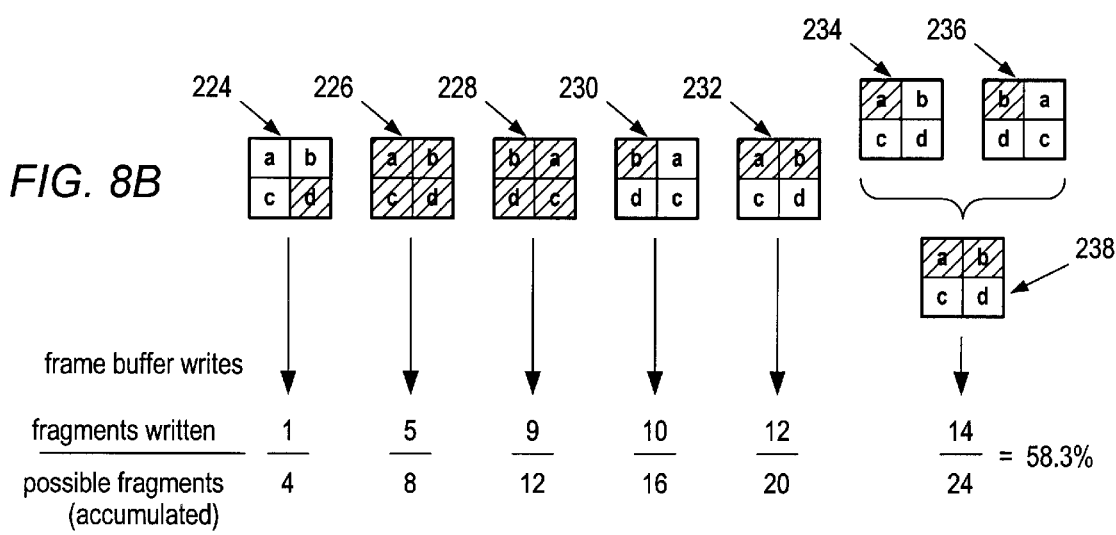

In FIG. 8b, the same example is illustrated utilizing the tile merging as described above. In this particular example, the merged tiles may require 6 writes to the frame buffer 22 potentially storing a total of 24 fragments. Given the same 14 valid fragments, this yields a 58.3% usage of the potential frame buffer 22 bandwidth.

Figure 8C:
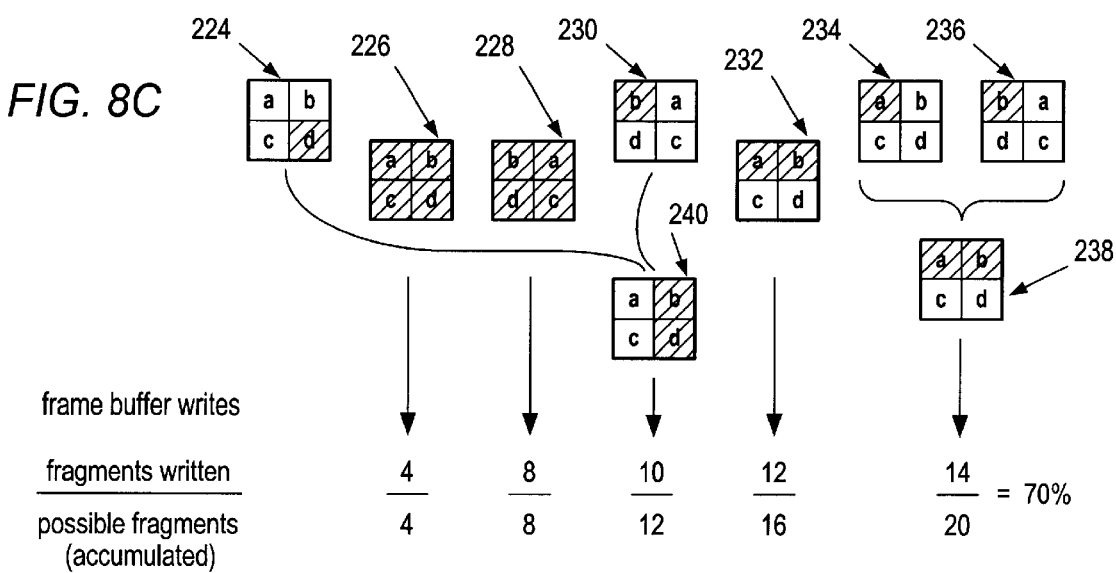

In other embodiments of the merge unit 206, full tiles may be ignored and passed through directly to the frame buffer 22. In FIG. 8c, the second and third tiles (226, 228) are full and pose no opportunity for merging and may therefore be passed on to the frame buffer 22. This may result in the first and fourth tiles of the sequence (224, 230) appearing to be subsequent to the merge unit 206. The merge unit 206 may then examine the first and fourth tiles (224, 230) and determine that each contains a single fragment and is non-intersecting (i.e., no two fragments from the combination of the two tiles are targeted to the same interleave). The two tiles (224, 230) may then be merged into a single tile (240) with two valid fragments and conveyed to the frame buffer 22. As in the previous example, the sixth and seventh tiles (234, 236) are merged into a single tile (238) with two valid fragments and conveyed to the frame buffer 22. Thus in this example, the merge unit 206 will output 5 tiles and write 14 out of a potential 20 fragments to the frame buffer 22 yielding 70% usage of the potential bandwidth of the frame buffer 22.

Turning now to FIG. 9, another fragment generation scenario resulting in subsequent tiles which may be merged is illustrated. In this example, the particular embodiment of the fragment generator 174 may render two vertically adjacent triangles (250, 252) by producing multiple horizontal strips of tiles. In FIG. 9a, the sample generator 174 may begin the first strip by creating two tiles (254, 256) from the first triangle (250). The two tiles (254, 256) may be communicated to the merge unit 206 where the determination may be made that no opportunity for combination exists and consequently, the first tile (254) may be conveyed to the frame buffer 22 for storage.

In FIG. 9b, the fragment generator 174 begins the second strip of the first triangle (250) by generating a partial tile (258). This tile (258) has two valid fragments targeted for the (a) and (b) interleaves whereas the previous tile (256) had only one valid fragment targeted for the (c) interleave. Hence, the two tiles (256, 258) may be merged and the resulting tile (268) having three valid fragments may be conveyed to the frame buffer 22. The second strip of the first triangle (250) is completed with the generation of a tile (260) with two valid fragments targeted for the (a) and (b) interleaves of the memory.

In FIG. 9c, the fragment generator 174 may now switch to the second triangle (252) and in so doing, may realign the boundaries of the generated tiles to the vertices and edges of the second triangle (252). The first strip of the second triangle may begin with the generation of a partial tile (262) with two valid fragments. From the illustration, it is seen that the current tile (262) may have fragments targeted for the (c) and (d) interleaves, whereas the previous tile (260) had two fragments targeted for the (a) and (b) interleaves. The merge unit (206) may therefore combine these two subsequent tiles with the resulting tile (270) being a full tile (i.e., four valid fragments) which may then be conveyed to the frame buffer 22 for storage. The first strip of the second triangle (252) may then be completed by the generation of a full tile (264) which poses no opportunity for combination, and may therefore be conveyed directly to the frame buffer 22.

In FIG. 9d, the rendering of the second triangle may be completed with a single tile (266) in the second strip. This tile (266) has only one valid fragment targeted for the (d) interleave. In the illustration of FIG. 9, this tile is conveyed to the frame buffer 22 as if it were the last tile generated in the image. In other examples, the tile may be held temporarily to test for the possibility of combination with the first tile from the next primitive rendered.

In FIG. 9e, the generation of the sequential tiles in the example described above is summarized. Without the creation of the two merged tiles (268, 270) there would be 7 writes to the frame buffer 22, storing 15 of 28 possible fragments. This yields a 53.6% usage of the potential bandwidth of the frame buffer 22. If the two merges are taken into account, then 5 writes to the frame buffer 22 would occur with 15 of a possible 20 fragments being stored. This yields a 75% usage of the potential frame buffer 22 bandwidth.

Turning now to FIG. 10, another tile generation scenario producing subsequent tiles which may be combined is illustrated. In the example of FIG. 10a, a Bresenham line 280 may be rendered by the fragment generator 174. The definition of a Bresenham line precludes any given tile having more than two valid fragments. Consequently, the rendering of a Bresenham line with no tile merging may utilize approximately 50% of the potential bandwidth of the frame buffer 22. In this particular example, the line 280 yields eight tiles two of which may be successfully merged, this is seen in the summary shown in FIG. 10b. The resulting two merged tiles (298, 300) have four (298) and three (300) valid fragments, bringing the percent utilization of the frame buffer 22 bandwidth potential to 62.5%

Figure 10A:
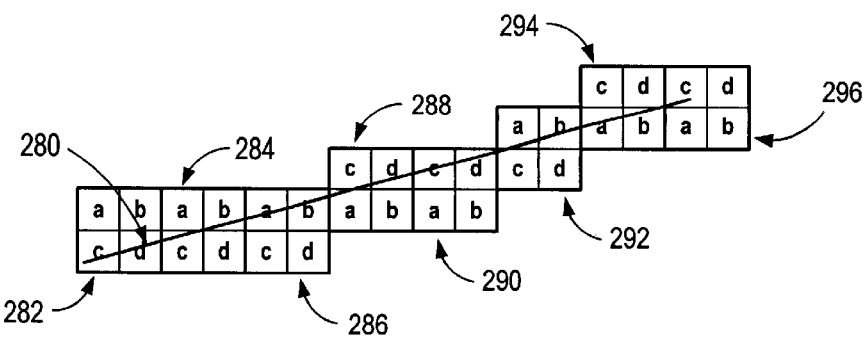
FIG. 10 is a diagrammatic illustration of two examples of rendering a Bresenham line which generates subsequent tiles presenting a merge opportunity.
Figure 10B:
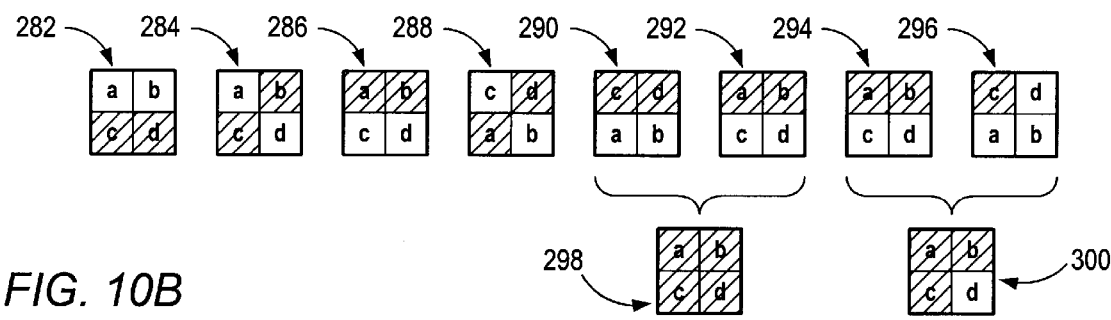
Figure 10C:
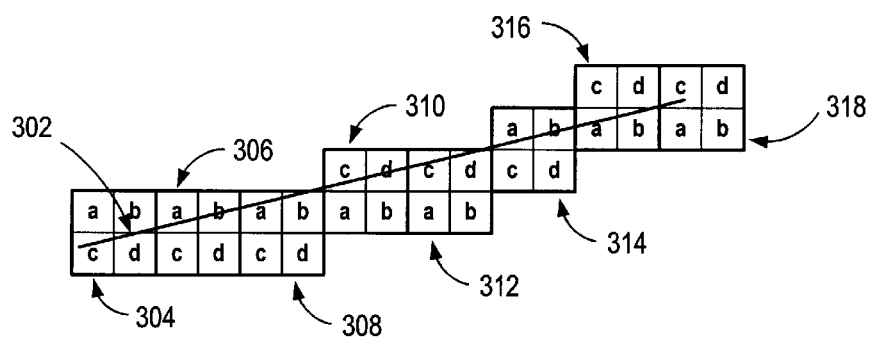
Figure 10D:
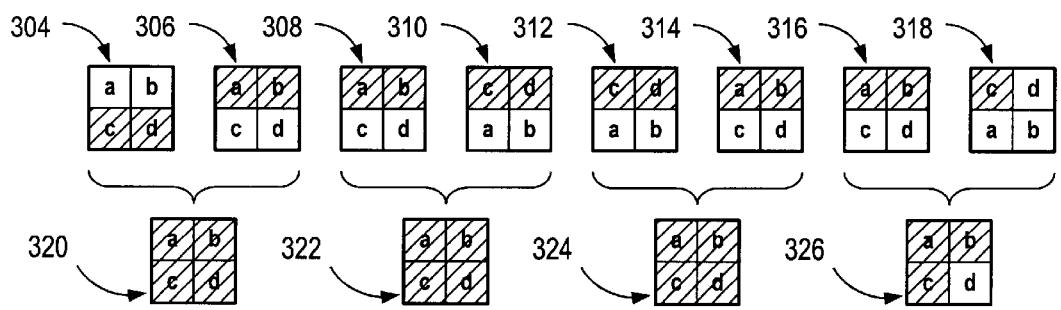

While the above examples imply quantifiable gains in the utilization of the frame buffer 22 bandwidth, the actual utilization and gains are dependent on numerous factors including but not limited to the size of the geometric primitives, the location of the primitives with respect to the fragment coordinate system, the primitive shapes, and the rendering direction chosen for particular primitives. Due to the complexity and stochastic nature of graphic objects and images, it is difficult to make determinations of the exact gains in memory bandwidth utilization due to the employment of the merge unit 206 as described above. As an example of this, FIG. 10c shows a Bresenham line 302 similar to that of FIG. 10a with the leftmost endpoint translated by less than one half of one fragment from the original location. The new sequence of generated tiles is shown in FIG. 10d. This example is not significantly different from that posed in FIG. 10a, however in this case four pairs of tiles may be successfully merged to yield a 93.75% utilization of the potential frame buffer 22 bandwidth.

Some embodiments of the merge unit 206 may employ different rules for merging subsequent tiles. The actual rules employed by a particular embodiment may be dependent on several factors such as the real estate available for implementation of the required circuitry, the need for sophisticated merging capabilities (e.g., a slow render engine may not require the same level of merging capability to operate with a given frame buffer 22 bandwidth), the statistical opportunities to merge provided by the application (e.g., an application or system designed to render only Bresenham lines may provide more merging opportunities than an application or system which renders only square primitives), the resolution of the images produced (e.g., low-resolution images with larger geometric primitives will offer less merging opportunities), and other numerous factors.

In some embodiments, the decision-making circuitry may be simplified by utilizing limitations. For example, one embodiment of a merge unit 206 may only allow merging of subsequent tiles if the tiles have one empty row or one empty column of fragments. In other embodiments, the merge unit 206 may only consider merging opportunities presented by subsequent tiles having a single fragment each.

Figure 11:
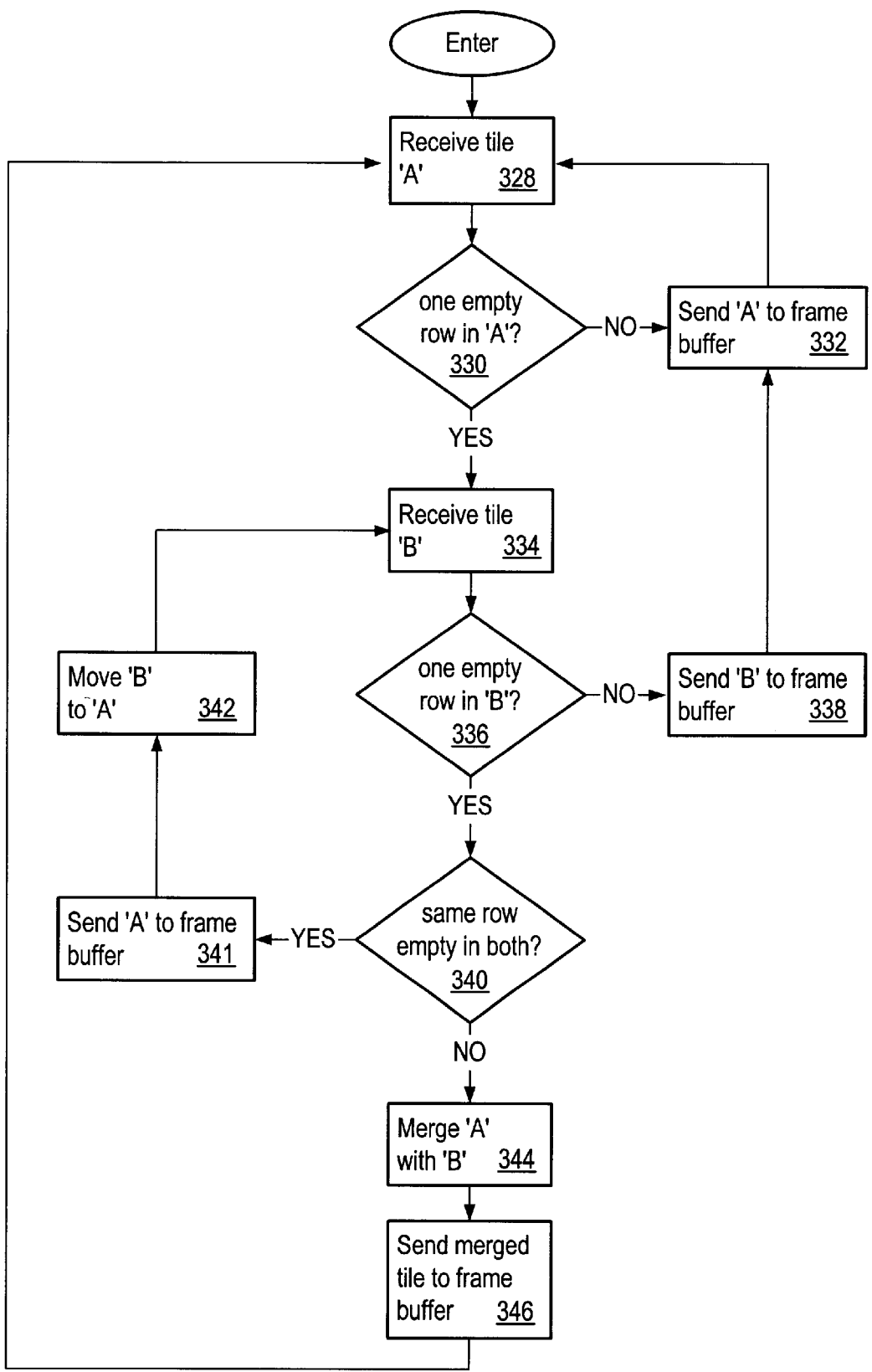
FIG. 11 is a flow diagram of one embodiment of a method for combining subsequent tiles of fragments.

Turning now to FIG. 11, one embodiment of a method to identify merging opportunities between subsequent tiles is illustrated. First, a tile may be received and placed in temporary storage space labeled "A" (step 328). Any tile stored in temporary location "A" will hereafter be referred to as A. Next, a determination may be made whether there are valid fragments in both rows of A (step 330). If both rows are found to contain at least one valid fragment, then A may be conveyed to the frame buffer 22 (step 332) and execution may branch back to step 328. If, however, at least one row of A is determined to be empty (i.e., contains no valid fragments), then the next tile may be received and placed in temporary storage space "B" (step 334). Any tile stored in temporary location "B" will hereafter be referred to B. Next, a determination may be made as to whether there are valid fragments in both rows of B (step 336). If both rows are found to contain at least one valid fragment, then B may be conveyed to the frame buffer 22 (step 338). Additionally, since B represents the only neighboring tile of A which may present an opportunity to merge, then A may also be conveyed to the frame buffer 22 (step 332), and execution may branch back to step 328.

If however, at least one row of B is determined to be empty, then B is retained and tested against A (step 340). If both A and B are found to contain the same empty rows, then A is conveyed to the frame buffer (step 341), B replaces A (step 342), and execution branches back to step 334. If, however, the empty rows of A and B are found to be different, then A and B are merged (step 344), the resulting tile conveyed to the frame buffer 22 (step 346), and execution branches back to step 328.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:
    a fragment generator configured to receive graphics data, wherein the fragment generator generates arrays of fragments according to the graphics data;
    a merge unit connected to the fragment generator and configured to merge two consecutive arrays of fragments and output a resultant array of fragments; and
    a memory connected to the merge unit and configured to store the resultant array of fragments;
    wherein the memory is interleaved, and wherein each element in the arrays of fragments is targeted for one memory interleave;
    wherein the merge unit is configured to merge two consecutive arrays of fragments if no two fragments contained in the two consecutive arrays of fragments are targeted for the same memory interleave.

2. The graphics system of claim 1, wherein the fragments are pixels.

3. The graphics system of claim 1, wherein the fragments are samples.

4. The graphics system of claim 1, wherein the merge unit is configured to merge two consecutive arrays of fragments if each of the two consecutive arrays of fragments has one empty row and there are no two fragments contained in the two consecutive arrays of fragments that are targeted for the same memory interleave.

5. The graphics system of claim 1 wherein the merge unit is configured to merge two consecutive arrays of fragments if each of the two consecutive arrays of fragments contains one fragment and the two fragments contained in the two consecutive arrays of fragments are targeted for different memory interleaves.

6. The graphics system of claim 1, wherein the merge unit is further configured to convey full arrays of fragments directly to the memory with no processing, and wherein arrays of fragments separated by a full array of fragments are processed as consecutive arrays by the merge unit.

7. The graphics system of claim 1, further comprising a shift register connected to the memory, wherein the shift register is configured to receive and store portions of the arrays of fragments from the memory, and wherein the shift register is further configured to output fragments serially in response to an external clock signal.

8. The graphics system of claim 7, further comprising a display device, wherein the display device displays images according to the fragments.

9. A graphics system comprising:
    a pixel engine configured to receive graphics information, wherein the pixel engine renders tiles of pixel data according to the graphics information, and wherein the tiles of pixel data are sets of spatially related pixels;
    a pixel concentrator connected to the pixel engine and configured to receive the tiles of pixel data, wherein the pixel concentrator is further configured to combine subsequent tiles of pixel data into packed tiles, wherein the packed tiles have the same dimensions as the tiles of pixel data; and
    a frame buffer connected to the pixel concentrator and configured to store the packed tiles.

10. The graphics system of claim 9, wherein the frame buffer comprises 3D-RAM devices.

11. The graphics system of claim 9, further comprising a bus interface, wherein the bus interface is configured to receive graphics information from a host system, and wherein the bus interface is further configured to reformat and communicate the graphics information to the pixel engine, wherein the pixel engine is configured to render the tiles of pixel data based on the graphics information.

12. The graphics system of claim 9, wherein the packed tiles represent the union of two non-intersecting tiles of pixel data.

13. The graphics system of claim 9, wherein the tiles of pixel data are not necessarily spatially contiguous.

14. A method for storing pixel data, the method comprising:
    a) receiving tiles of pixel data, wherein the tiles of pixel data are sets of spatially related pixels;
    b) testing subsequent tiles of pixels data against a fixed set of rules of combination, and combining the subsequent tiles of pixel data according to the results of the testing to form a packed tile; and
    c) storing the packed tile in a memory.

15. The method of claim 14, wherein the tiles of graphics data comprise rows of columns of graphics data, and wherein the rules of combination comprise:
    two subsequent tiles of graphics data are eligible for combination if the intersection of the two subsequent tiles of graphics data is an empty set.

16. The method of claim 14, wherein the tiles of pixel data comprise rows of columns of pixel data, and wherein the rules of combination comprise:
    two subsequent tiles of pixel data are eligible for combination if the intersection of the two subsequent tiles of pixel data is an empty set, and both subsequent tiles of pixel data contain at least one empty row.

17. The method of claim 14, wherein the tiles of graphics data comprise rows of columns of graphics data, and wherein the rules of combination comprise:
    two subsequent tiles of graphics data are eligible for combination if the intersection of the two subsequent tiles of graphics data is an empty set, and both subsequent tiles of graphics data contain a single pixel.

18. The method of claim 14, wherein storing the packed tile comprises a parallel write to the memory of all the pixels contained in the packed tile.

19. The method of claim 14, further comprising:
    determining whether any received tile of pixel data is full, storing any full tile of pixel data in the memory; and receiving a new tile of pixel data to replace the full tile of pixel data.

20. A method for writing a merged array of graphics data from two subsequent arrays of graphics data to an interleaved memory, the method comprising:
    a) receiving a first array of graphics data and storing the first array of graphics data in a first temporary storage space;
    b) receiving a second array of graphics data and storing the second array of graphics data in a second temporary storage space;

c) testing the intersection of the first array of graphics data with the second array of graphics data, wherein said testing comprises identifying the first and second arrays as ineligible for merging in response to determining two elements contained in the union of the first array of graphics data and the second array of graphics data are targeted for the same memory interleave;

d) merging the first array and the second array to form a merged array of graphics data based on the result of the intersection test of (c); and e) outputting each element of the merged array of graphics data to a corresponding interleave of the interleaved memory according to the result of the intersection test of (c).

21. The method of claim 20, further comprising:

replacing the least recently received array of graphics data in the first and second temporary storages spaces with a new array of graphics data in response to failing the intersection test of (c), wherein failing the intersection test means the intersection of the two arrays of graphics data is not an empty set.

22. The method of claim 20, wherein the interleaved memory is subdivided into logical blocks, and wherein the method further comprises:

determining the logical blocks of interleaved memory targeted for the two arrays of graphics data, and not performing (c), (d) and (e) if the two target logical blocks are different.

23. The method of claim 20, further comprising:

testing the first array of graphics data and the second array of graphics data against a fixed set of rules for merging, wherein the rules for merging comprise:
  identifying an array of graphics data as ineligible for merging if more than two of the elements of the array of graphics data contain valid data; and
  identifying an array of graphics data as ineligible for merging if the elements of the array which contain valid data are not constrained to a single row or a single column.

24. The method of claim 20, wherein the first array of graphics data, the second array of graphics data, and the merged array of graphics data have the same dimensions, and wherein the number of interleaves in the interleaved memory is equal to the number of elements in the merged array of graphics data.

25. A graphics system comprising:

a fragment generator configured to receive graphics data, wherein the fragment generator generates arrays of fragments according to the graphics data;

a merge unit connected to the fragment generator and configured to merge two consecutive arrays of fragments and output a resultant array of fragments; and a memory connected to the merge unit and configured to store the resultant array of fragments;

wherein the merge unit is further configured to convey full arrays of fragments directly to the memory with no processing, and wherein arrays of fragments separated by a full array of fragments are processed as consecutive arrays by the merge unit.

26. A method for writing a merged array of graphics data from two subsequent arrays of graphics data to an interleaved memory, the method comprising:

a) receiving a first array of graphics data and storing the first array of graphics data in a first temporary storage space;

b) receiving a second array of graphics data and storing the second array of graphics data in a second temporary storage space;

c) testing the intersection of the first array of graphics data with the second array of graphics data;

d) merging the first array and the second array to form a merged array of graphics data based on the result of the intersection test of (c); and e) outputting each element of the merged array of graphics data to a corresponding interleave of the interleaved memory;

f) replacing the least recently received array of graphics data in the first and second temporary storages spaces with a new array of graphics data in response to failing the intersection test of (c), wherein failing the intersection test means the intersection of the two arrays of graphics data is not an empty set.

27. A method for writing a merged array of graphics data from two subsequent arrays of graphics data to an interleaved memory, the method comprising:

a) receiving a first array of graphics data and storing the first array of graphics data in a first temporary storage space;

b) receiving a second array of graphics data and storing the second array of graphics data in a second temporary storage space;

c) testing the intersection of the first array of graphics data with the second array of graphics data;

d) merging the first array and the second array to form a merged array of graphics data based on the result of the intersection test of (c); and (e) outputting each element of the merged array of graphics data to a corresponding interleave of the interleaved memory;

wherein the interleaved memory is subdivided into logical blocks, and wherein the method further comprises:
  determining the logical blocks of interleaved memory targeted for the two arrays of graphics data, and not performing (c), (d) and (e) if the two target logical blocks are different.

28. A method for writing a merged array of graphics data from two subsequent arrays of graphics data to an interleaved memory, the method comprising:

a) receiving a first array of graphics data and storing the first array of graphics data in a first temporary storage space;

b) receiving a second array of graphics data and storing the second array of graphics data in a second temporary storage space;

c) testing the first array of graphics data and the second array of graphics data against a fixed set of rules for merging, wherein the rules for merging comprise:
  identifying an array of graphics data as ineligible for merging if more than two of the elements of the array of graphics data contain valid data; and
  identifying an array of graphics data as ineligible for merging if the elements of the array which contain valid data are not constrained to a single row or a single column;

d) merging the first array and the second array to form a merged array of graphics data based on the result of the intersection test of (c); and e) outputting each element of the merged array of graphics data to a corresponding interleave of the interleaved memory.

29. A method for writing a merged array of graphics data from two subsequent arrays of graphics data to an interleaved memory, the method comprising:
   a) receiving a first array of graphics data and storing the first array of graphics data in a first temporary storage space;
   b) receiving a second array of graphics data and storing the second array of graphics data in a second temporary storage space;
   c) testing the intersection of the first array of graphics data with the second array of graphics data;
   d) merging the first array and the second array to form a merged array of graphics data based on the result of the intersection test of (c); and
   e) outputting each element of the merged array of graphics data to a corresponding interleave of the interleaved memory;

wherein the first array of graphics data, the second array of graphics data, and the merged array of graphics data have the same dimensions, and wherein the number of interleaves in the interleaved memory is equal to the number of elements in the merged array of graphics data.

* * * * *

UNITED STATES PATENT AND TRADEMARK OFFICE
CERTIFICATE OF CORRECTION

PATENT NO. : 6,704,026 B2
DATED : March 9, 2004
INVENTOR(S) : Kurihara et al.

It is certified that error appears in the above-identified patent and that said Letters Patent is hereby corrected as shown below:

Column 15,
Lines 13 and 14, please delete "according to the result of the intersection test of (c)".
Line 18, please delete "storages" and substitute -- storage --.

Column 16,
Line 14, please delete "storages" and substitute -- storage --.

Signed and Sealed this

Twenty-second Day of June, 2004

JON W. DUDAS
*Acting Director of the United States Patent and Trademark Office*